(12) United States Patent
Nomi et al.

(10) Patent No.: US 12,299,276 B2
(45) Date of Patent: *May 13, 2025

(54) DIGITAL INK PROCESSING SYSTEM, METHOD, AND PROGRAM

(71) Applicant: Wacom Co., Ltd., Saitama (JP)

(72) Inventors: Tsukasa Nomi, Saitama (JP); Hideki Fujimaki, Saitama (JP); Seigo Nishiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,811

(22) Filed: Jan. 12, 2024

(65) Prior Publication Data

US 2024/0143163 A1 May 2, 2024

Related U.S. Application Data

(63) Continuation of application No. 17/674,501, filed on Feb. 17, 2022, now Pat. No. 11,907,524, which is a
(Continued)

(30) Foreign Application Priority Data

Sep. 13, 2019 (JP) .................. 2019-167137

(51) Int. Cl.
*G06F 3/04883* (2022.01)
*G06F 3/0354* (2013.01)
(Continued)

(52) U.S. Cl.
CPC ...... *G06F 3/04883* (2013.01); *G06F 3/03545* (2013.01); *G06F 16/90335* (2019.01); *G06F 40/171* (2020.01); *G06V 30/347* (2022.01)

(58) Field of Classification Search
CPC ............. G06F 3/04883; G06F 3/03545; G06F 16/90335; G06F 40/171; G06F 3/04842;
(Continued)

(56) References Cited

U.S. PATENT DOCUMENTS 10,275,528 B2   4/2019 Sugihara et al.
11,907,524 B2 * 2/2024 Nomi ................. G06F 16/2457
(Continued)

FOREIGN PATENT DOCUMENTS

JP   2001-350396 A   12/2001
JP   2010-113656 A    5/2010
(Continued)

OTHER PUBLICATIONS

Extended European Search Report, dated Aug. 12, 2022, for European Application No. 20862062.5-1224, 7 pages.
(Continued)

*Primary Examiner* — Stephen G Sherman
(74) *Attorney, Agent, or Firm* — Seed IP Law Group LLP

(57) ABSTRACT

A digital ink processing system, method, and program are provided that are capable of presenting, to a user, useful and highly relevant information as a search result when a search is performed using digital ink. A processor included in a tablet enables a pointing operation of an electronic pen relative to a stroke or strokes. The processor, after enabling the pointing operation of the electronic pen, performs a search for content related to a semantic attribute of the stroke or strokes pointed at, or requests an external server to perform the search. The processor performs control so as to display the related content retrieved by the search on a display with the stroke or strokes.

19 Claims, 17 Drawing Sheets

Related U.S. Application Data continuation of application No. PCT/JP2020/034425, filed on Sep. 11, 2020.

(51) Int. Cl.
*G06F 16/903* (2019.01)
*G06F 40/171* (2020.01)
*G06V 30/32* (2022.01)

(58) Field of Classification Search
CPC .. G06F 3/0412; G06F 3/0488; G06F 16/2428; G06F 16/243; G06F 16/2457; G06F 16/903; G06F 18/22; G06F 18/24; G06F 40/169; G06F 40/117; G06V 30/347; G06Q 10/10; G06Q 30/04; G06Q 30/06; G06Q 50/20
See application file for complete search history.

(56) References Cited

U.S. PATENT DOCUMENTS

| | | |
|---|---|---|
| 2012/0242603 A1 | 9/2012 | Engelhardt et al. |
| 2014/0072225 A1 | 3/2014 | Ogawa |
| 2018/0212684 A1 | 7/2018 | Aoyama et al. |
| 2018/0300301 A1 | 10/2018 | Mikutel et al. |
| 2018/0336173 A1 | 11/2018 | Mikutel et al. |

FOREIGN PATENT DOCUMENTS

| | | |
|---|---|---|
| JP | 2014-052914 A | 3/2014 |
| JP | 2015-114955 A | 6/2015 |

OTHER PUBLICATIONS

International Search Report, mailed Oct. 13, 2020, for International Application No. PCT/JP2020/034425, 2 pages.

* cited by examiner

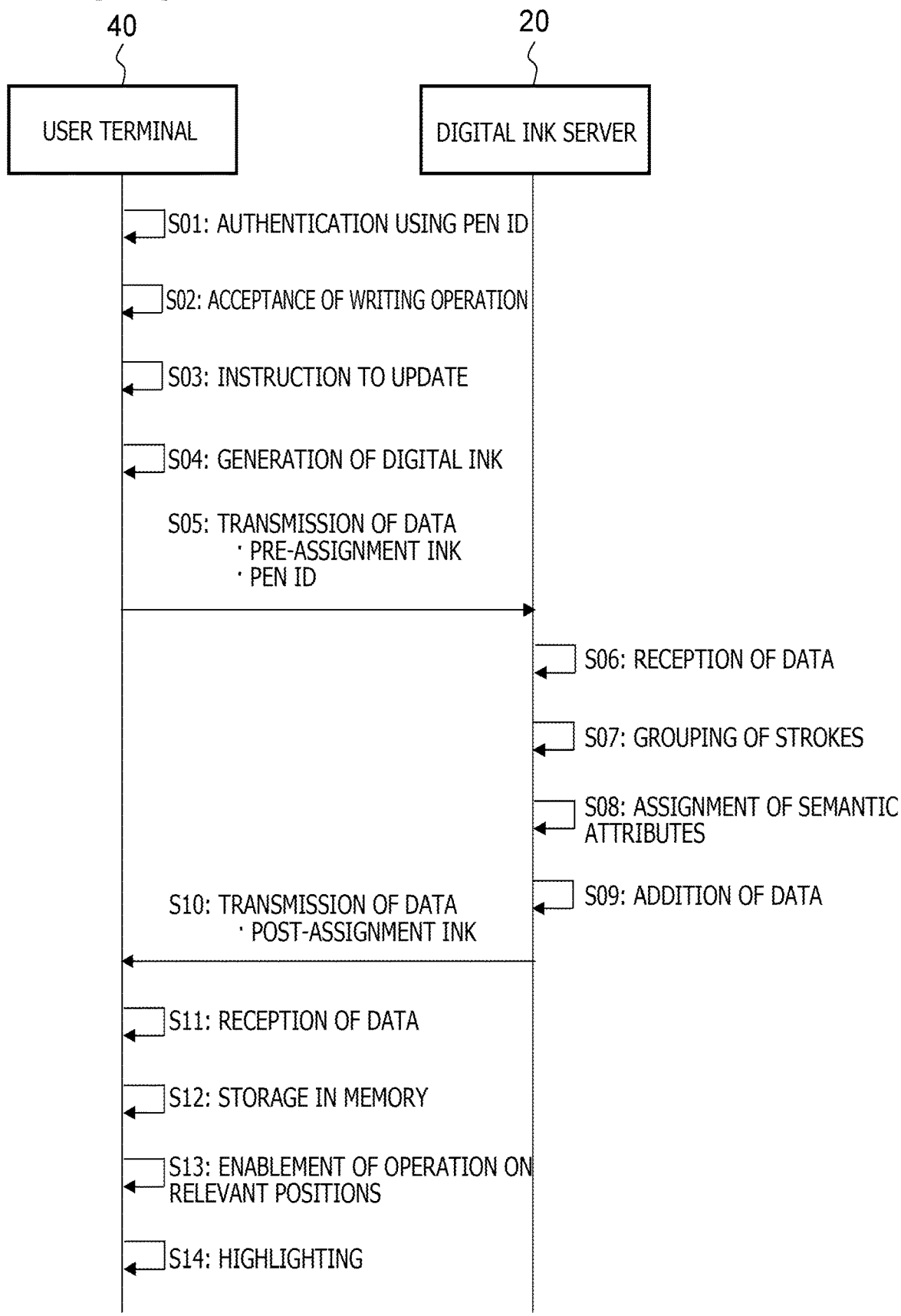

FIG. 4A

G0
- Milk
- Bread
- eggs
- apples

FIG. 4B
```
{
    "documentMetadata":......,
    "inksemantics":,
    "devices":............,
    "strokes":.................,
    "groups":,
    "contexts":............,
}
```

FIG.9A
62

| PEN ID | SCHOOL | YEAR CLASS |
|---|---|---|
| 000001 | XYZ JUNIOR HIGH SCHOOL | SECOND YEAR, CLASS A |
| 000002 | PQR HIGH SCHOOL | THIRD YEAR, CLASS B |
| 000003 | XYZ PREPARATORY SCHOOL | — |
| ... | ... | ... |

FIG.9B
64

| SCHOOL | YEAR CLASS | CONTENT TYPES |
|---|---|---|
| XYZ JUNIOR HIGH SCHOOL | FIRST YEAR ALL CLASSES | a1,b1,c1,d1 |
| XYZ JUNIOR HIGH SCHOOL | SECOND YEAR ALL CLASSES | a2,b2,c2,d2,e2 |
| XYZ JUNIOR HIGH SCHOOL | THIRD YEAR ALL CLASSES | a3,b3,c3,d3,e3,f3 |
| ... | ... | ... |

66

| NUMBER OF OCCURRENCES | DEGREE OF ACHIEVEMENT |
|---|---|
| 9 OR LESS | LOW |
| 10 TO 19 | INTERMEDIATE |
| 20 OR MORE | HIGH |

DIGITAL INK PROCESSING SYSTEM, METHOD, AND PROGRAM

BACKGROUND

Technical Field

The present disclosure relates to a digital ink processing system, method, and program for processing digital ink.

Description of the Related Art

Patent Document 1 discloses a technique of performing a search by setting as a search key at least a portion of information displayed on a screen of an information processing apparatus such as a personal computer, and display a search result in a pop-up window on the screen.

PRIOR ART DOCUMENT

Patent Document

Patent Document 1: Japanese Patent Laid-Open No. 2015-114955

SUMMARY OF DISCLOSURE

Technical Problems

In digital ink representative of a set of strokes, strokes often convey meaning only as a group. However, when a user, while editing the digital ink, points to a section to set it as a search key to attempt a search, the search key may fail to convey any meaning or the search key may convey wrong meaning, resulting in a failure to return appropriate search results.

An aspect of the present disclosure is to provide a digital ink processing system, method, and program that are capable of presenting, to a user, useful and highly relevant information as a search result when a search is performed using digital ink.

Technical Solution

According to a first aspect of the present disclosure, a digital ink processing system includes an electronic pen, and a tablet that generates digital ink describing a stroke or strokes according to an input made by the electronic pen through a display. The tablet has a processor, and the processor enables a pointing operation of the electronic pen relative to the stroke or strokes. After enabling the pointing operation of the electronic pen relative to the stroke or strokes, the processor performs a search for content related to a semantic attribute of the stroke or strokes pointed at, or requests an external server to perform the search, and performs control so as to display content retrieved by the search on the display with the stroke or strokes.

Further, the processor may perform control so as to cause the stroke or strokes for which the pointing operation has been enabled to be highlighted on the display as compared to before the enablement.

Further, the processor may enable the pointing operation of the electronic pen relative to a stroke or strokes to which a semantic attribute has been assigned.

The system may further include a digital ink server that analyzes the digital ink transmitted from the tablet and assigns the semantic attribute to the stroke or strokes. The processor may enable the pointing operation of the electronic pen relative to a stroke or strokes for which semantic data representative of the semantic attribute has been acquired from the digital ink server.

Further, the processor may enable the pointing operation of the electronic pen relative to a stroke or strokes on which a user operation of adding a mark or an annotation has been performed.

The system may further include a content server that stores content in association with use IDs (use identifications). The processor may transmit data, which includes the use ID and the semantic attribute, to the content server and request a search to acquire, from the content server, content that relates to the semantic attribute and that is usable.

Further, the processor may acquire a different one of the content depending on the degree of occurrence of the semantic attribute based on the same use ID.

Further, the use ID may be a pen ID that identifies the electronic pen.

Further, in a case where the digital ink is generated using a first electronic pen that is assigned a first pen ID, while a second electronic pen is used that is assigned a second pen ID different from the first pen ID, the processor may prohibit or restrict editing of the digital ink while accepting the pointing operation.

Further, the content server may perform a charging process according to usage of content, for a user of the content and a business entity that provides the content.

According to a second aspect of the present disclosure, a digital ink processing method executed by a processor is provided, wherein the processor is configured to generate digital ink describing a stroke or strokes according to an input made by an electronic pen through a display. The method includes enabling a pointing operation of the electronic pen relative to the stroke or strokes. The method includes, after enabling the pointing operation of the electronic pen relative to the stroke or strokes, performing a search for content related to a semantic attribute of the stroke or strokes pointed at, or requesting an external server to perform the search. The method includes performing control so as to display content retrieved by the search on the display with the stroke or strokes.

According to a third aspect of the present disclosure, a digital ink processing program is provided that causes a processor configured to generate digital ink describing a stroke or strokes according to an input made by an electronic pen through a display to execute: a step of enabling a pointing operation of the electronic pen relative to the stroke or strokes, a step of, after enabling the pointing operation of the electronic pen relative to the stroke or strokes, performing a search for content related to a semantic attribute of the stroke or strokes pointed at, or requesting an external server to perform the search, and a step of performing control so as to display content retrieved by the search on the display with the stroke or strokes.

BRIEF SUMMARY

The present disclosure makes it possible to present, to a user, useful and highly relevant information as a search result when a search is performed using digital ink.

BRIEF DESCRIPTION OF THE SEVERAL VIEWS OF THE DRAWINGS

FIG. 3 is a sequence diagram concerning a semantic interpretation operation of the digital ink processing system.

FIG. 4A is a schematic diagram illustrating a set of strokes in a legible form.

FIG. 4B is a diagram illustrating an example of a data structure of digital ink.

FIG. 9A is a diagram illustrating an example of the data structure of electronic pen information.

FIG. 9B is a diagram illustrating an example of the data structure of content management information.

DETAILED DESCRIPTION

[Configuration of Digital Ink Processing System 10]

Figure 1:
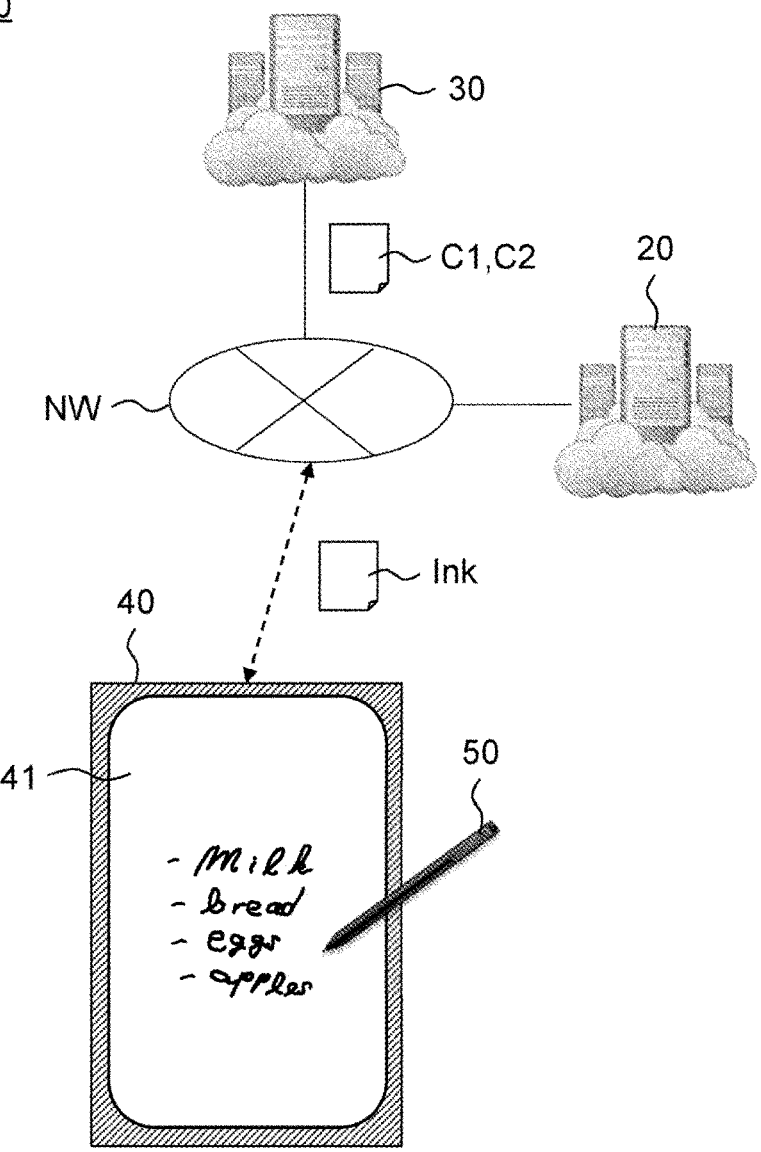
FIG. 1 is an overall configuration diagram of a digital ink processing system according to an embodiment of the present disclosure.
Figure 2:
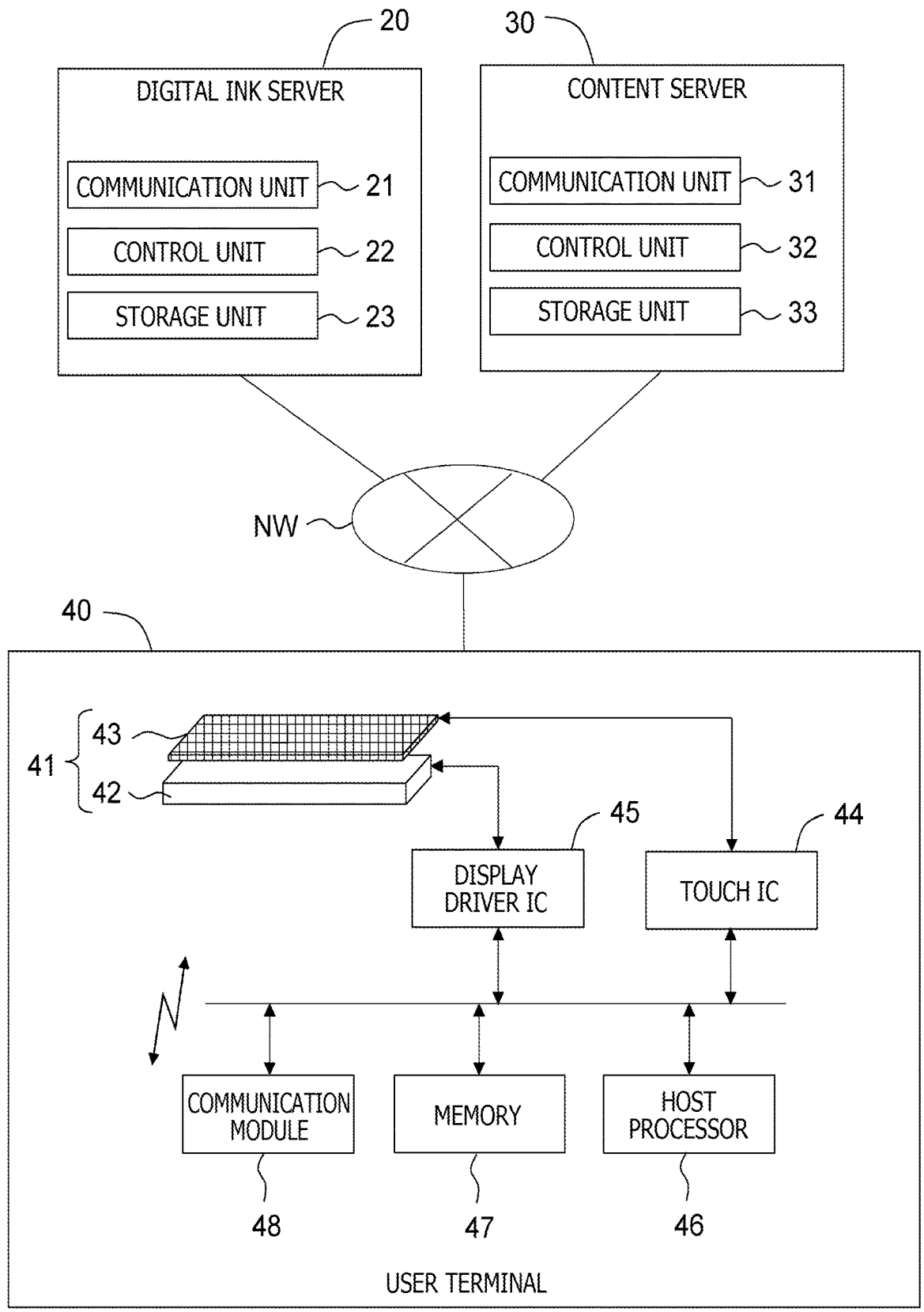
FIG. 2 is a block diagram of a digital ink server, a content server, and a user terminal illustrated in FIG. 1.

FIG. 1 is an overall configuration diagram of a digital ink processing system 10 according to an embodiment of the present disclosure. FIG. 2 is a block diagram of a digital ink server 20, a content server 30, and a user terminal 40 illustrated in FIG. 1. The digital ink processing system 10 is configured to be capable of providing a "learning support service" to allow a user, such as a student, to learn efficiently using an electronic notebook. Specifically, the digital ink processing system 10 includes the digital ink server 20, the content server 30, one or more user terminals 40, and one or more electronic pens 50.

WILL (Wacom Ink Layer Language), InkML (Ink Markup Language), and ISF (Ink Serialized Format) are exemplary data formats of digital ink (or ink data), which are generally called "ink markup languages." Various types of software and programming languages can exchange data with each other by using a data structure format of JSON (JavaScript® Object Notation) to describe such digital ink.

The digital ink server 20 is a computer that performs centralized control related to processing of digital ink Ink, and may be either of a cloud type or an on-premises type. Here, the digital ink server 20 is depicted as a single computer in the figure, but the digital ink server 20 may alternatively be implemented as a group of computers that form a distributed system.

The digital ink server 20 specifically includes a communication unit 21, a control unit 22, and a storage unit 23. The communication unit 21 is an interface for transmitting and receiving electrical signals to and from an external device. The control unit 22 is formed of a processing/computing device including a CPU (Central Processing Unit) or a GPU (Graphics Processing Unit). The control unit 22 functions as a "processing engine" for the digital ink Ink by loading and executing a program stored in the storage unit 23. The storage unit 23 is formed of a non-transitory computer-readable storage medium, such as an HDD (Hard Disk Drive) or an SSD (Solid State Drive). Thus, the storage unit 23 stores various data handled by the digital ink server 20.

The content server 30 is a computer that performs centralized control related to provision of educational content including a textbook and a dictionary, and may be either of the cloud type or the on-premises type. Here, the content server 30 is depicted as a single computer in the figure, but the content server 30 may alternatively be implemented as a group of computers that form a distributed system.

The content server 30 specifically includes a communication unit 31, a control unit 32, and a storage unit 33. The communication unit 31 is an interface for transmitting and receiving electrical signals to and from an external device. The control unit 32 is formed of a processing/computing device including a CPU or a GPU. The control unit 32 is configured to be capable of searching for and providing content suited for a user by loading and executing a program stored in the storage unit 33.

The user terminal 40 is a terminal that functions as an electronic notebook, and is formed of, for example, a tablet, a smart phone, or a personal computer. The user terminal 40 specifically includes a touchscreen display 41, a touch IC (Integrated Circuit) 44, a display driver IC 45, a host processor 46, a memory 47, and a communication module 48.

The touchscreen display 41 includes a display panel 42 capable of outputting content in a visible form, and sensor electrodes 43 arranged on a display screen of the display panel 42 in an overlapping manner. The display panel 42 is capable of displaying a black-and-white image or a color image, and may be, for example, a liquid crystal panel or an organic EL (Electro-Luminescence) panel. The sensor electrodes 43 are formed of a planar arrangement of an X-Y sensor coordinate system including a plurality of X-line electrodes for sensing positions along an X-axis and a plurality of Y-line electrodes for sensing positions along a Y-axis.

The touch IC 44 is an integrated circuit for performing drive control of the sensor electrodes 43. The touch IC 44 drives the sensor electrodes 43 on the basis of control signals supplied from the host processor 46. The touch IC 44 thus implements a "pen detection function" of detecting the state of the electronic pen 50, and a "touch detection function" of detecting a touch made by a finger or the like of a user.

The display driver IC 45 is an integrated circuit for performing drive control of the display panel 42. The display driver IC 45 drives the display panel 42 on the basis of image signals supplied from the host processor 46 on a frame by frame basis. Images are thus displayed in a display area of the display panel 42. These images may include a handwritten line drawn by the user using the electronic pen 50—as well as an application window, an icon, and/or a cursor.

The host processor 46 is formed of a processing/computing device including an MPU (Micro-Processing Unit) or a CPU. The host processor 46 performs a process of generating digital ink Ink using data from the touch IC 44, an ink reproduction process for displaying a drawing represented by the digital ink Ink, and so on, by loading and executing a program stored in the memory 47.

The memory 47 is formed of a non-transitory computer-readable storage medium. Here, the computer-readable storage medium is a portable medium, such as a magneto-optical disk, a ROM (Read Only Memory), a CD-ROM (Compact Disc-Read Only Memory), or a flash memory, or a storage device, such as an HDD or an SSD, contained in a computer system.

The communication module 48 is configured to be capable of transmitting and receiving electrical signals to and from an external device using cable communication or wireless communication. Thus, the user terminal 40 is capable of, for example, transmitting and receiving digital ink Ink to and from the digital ink server 20, and receiving related content C1 and C2 from the content server 30, through a network NW.

The electronic pen 50 is a pen-type pointing device and is configured to be capable of performing one-way or two-way communication through capacitive coupling with the user terminal 40. The user is able to draw a picture or a character on the user terminal 40 by holding the electronic pen 50 and moving the electronic pen 50 with a pen tip in contact with a touch surface of the touchscreen display 41. The electronic pen 50 is, for example, a stylus of an active capacitive coupling type (AES (active electrostatic)) or an electromagnetic induction type (EMR (electro magnetic resource)).

[Operations of Digital Ink Processing System 10]

The digital ink processing system 10 according to this embodiment has the above-described configuration. Next, first and second operations of the digital ink processing system 10 will be described below, mainly referring to sequence diagrams of FIGS. 3 and 8. The "first operation" refers to an operation related to "semantic interpretation" of interpreting a collection of strokes and automatically assigning a semantic attribute (or a meaning attribute) to the collection of strokes. Meanwhile, the "second operation" refers to an operation related to "content citation" of timelily citing and displaying content related to the semantic attribute.

<First Operation: Semantic Interpretation Operation>

First, the first operation of the digital ink processing system 10, i.e., a semantic interpretation operation, will now be described below. The first operation is implemented jointly by the user terminal 40 (more specifically, the host processor 46) and the digital ink server 20 (more specifically, the control unit 22).

In step S01 in FIG. 3, the user terminal 40 performs an authentication using identification information (hereinafter referred to as a pen ID) of the electronic pen 50. When a pen ID received and obtained from the electronic pen 50 has been previously registered, the user terminal 40 permits editing of digital ink Ink by the electronic pen 50. Meanwhile, when the pen ID has not been registered, the user terminal 40 does not permit editing of the digital ink Ink by the electronic pen 50.

In step S02, the user terminal 40 accepts an input made using the electronic pen 50 that has been permitted to make edits in step S01, wherein the input includes a variety of writing operations by the user. Examples of the writing operations include addition, deletion, and change of strokes, selection of an icon, and addition of a mark or an annotation.

In step S03, the user terminal 40 updates the digital ink Ink, either periodically or aperiodically, to reflect the writing operation accepted in step S02 in the digital ink Ink. In the former case, the digital ink Ink may be updated when a predetermined time has passed since the last update time, for example. In the latter case, the digital ink Ink may be updated when an update instruction operation by the user is received, for example.

In step S04, the user terminal 40 generates digital ink Ink in WILL (Ver. 3.0) format, for example, using data obtained through the writing operation in step S02.

FIG. 4A is a schematic diagram illustrating a set G0 of strokes in a visible (legible) form. Here, the set G0 represents a handwritten shopping list, and includes items of "milk," "bread," "eggs," and "apples" arranged in order from top to bottom. FIG. 4B is a diagram illustrating an example of the data structure of the digital ink Ink. The digital ink Ink has a data structure in which [1] document metadata, [2] semantic data (ink semantics), [3] device data (devices), [4] stroke data (strokes), [5] grouping data (groups), and [6] context data (contexts) are arranged in order.

When the digital ink Ink is generated, the document metadata, the device data, the stroke data, and the context data have already been determined, but the semantic data and the grouping data are not yet determined. That is, (1) grouping of strokes and (2) assignment of semantic attributes, which will be described below, are not yet completed with respect to the digital ink Ink. Hereinafter, digital ink Ink in which both the grouping data and the semantic data have NULL values may be referred to as "pre-assignment ink."

In step S05, the user terminal 40 transmits the pre-assignment ink generated in step S04, with the pen ID associated therewith, to the digital ink server 20.

In step S06, the digital ink server 20 receives the data transmitted from the user terminal 40 in step S05, thus acquiring the pre-assignment ink and the pen ID.

In step S07, the digital ink server 20 analyzes the stroke data included in the pre-assignment ink acquired in step S06, and performs grouping of the strokes. Specifically, the digital ink server 20 groups the set G0 of strokes into one or more groups (for example, five groups G1 to G5) on the basis of, for example, the order, positions, and shapes of the strokes identified by the stroke data or the pen pressure of the electronic pen 50. As a result of this grouping, grouping data is obtained that describes what stroke elements are included in what groups or what groups are included in what groups.

In step S08, the digital ink server 20 performs a process of assigning semantic attributes to the groups G1 to G5 of strokes obtained by the grouping in step S07. Specifically, the digital ink server 20 uses a discriminator (e.g., a hierarchical neural network) subjected to machine learning to infer a semantic attribute of each of the groups G1 to G5 and to assign the semantic attribute to each of the groups. As a result of this process, grouping data is obtained that describes a semantic attribute of each group, wherein the semantic attribute includes a type and a value in a pair.

For example, the above-mentioned discriminator is configured to receive input of feature amounts of the strokes (e.g., coordinates of starting points, intermediate points, and ending points, curvatures, etc.), and to output labels of semantic attributes. Examples of the "type" include a text (including a language type), a drawing (including a drawing type), a mathematical equation, a chemical formula, a list, a table, and so on. Examples of the "value" include a handwritten character or character string (e.g., "milk"), a name of a hand-drawn object (e.g., "pencil" for an illustration of a pencil), and so on.

Figure 5A:
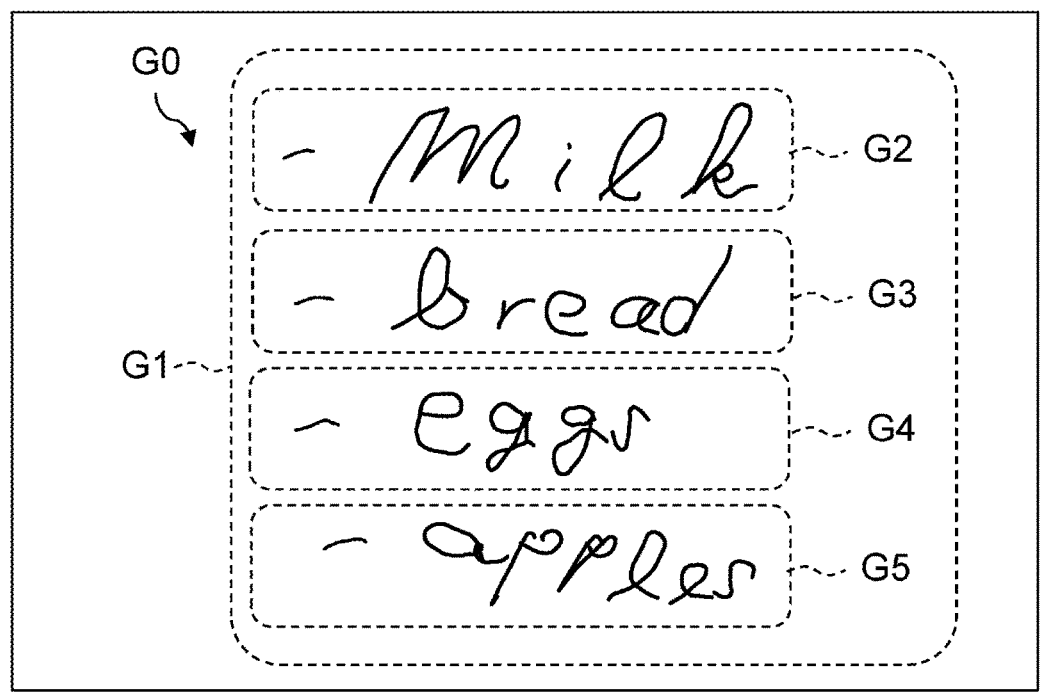
FIG. 5A is a diagram illustrating a result of grouping of the strokes.
Figure 5B:
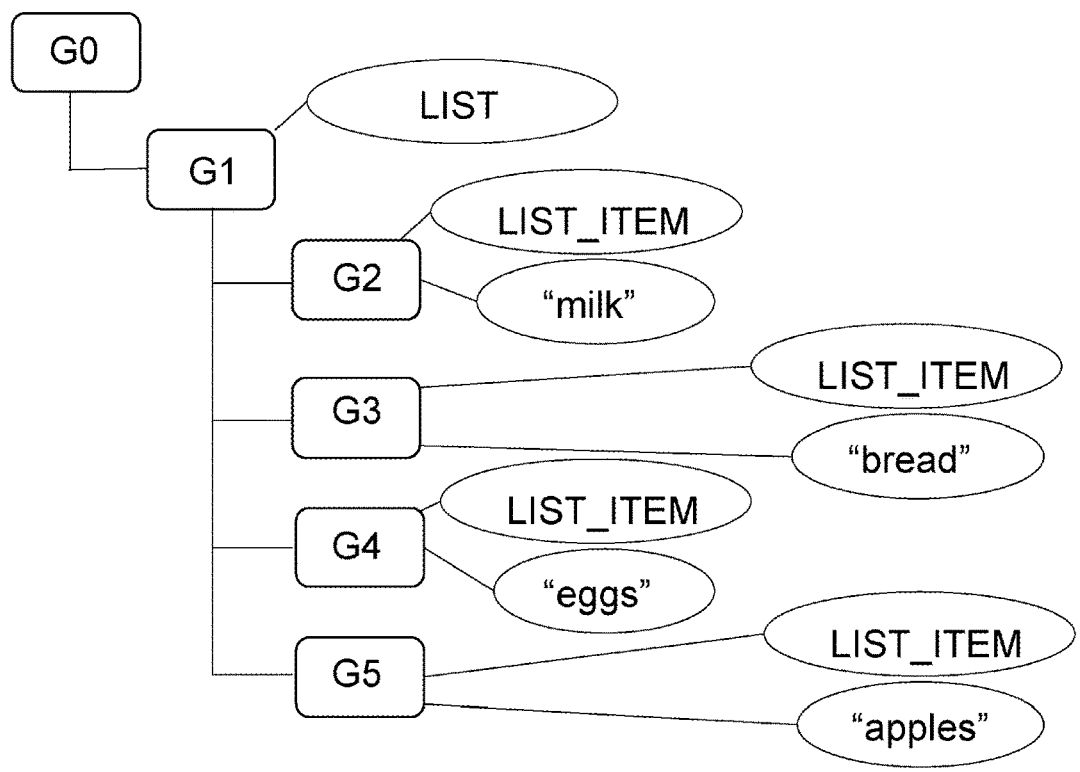
FIG. 5B is a diagram illustrating a result of assignment of semantic attributes to groups obtained by the grouping in FIG. 5A.

FIG. 5A is a diagram illustrating a result of the grouping of the strokes. As will be understood from the figure, the set G0 includes group G1, and group G1 is made up of four groups G2 to G5. FIG. 5B is a diagram illustrating a result of the assignment of semantic attributes to the groups obtained by the grouping in FIG. 5A. The type and value of group G1 are "LIST" and "NULL," respectively. The type and value of group G2 are "LIST_ITEM" and "milk," respectively. The type and value of group G3 are "LIST_ITEM" and "bread," respectively. The type and value of group G4 are "LIST_ITEM" and "eggs," respectively. The type and value of group G5 are "LIST_ITEM" and "apples," respectively.

In step S09 in FIG. 3, the digital ink server 20 updates the pre-assignment ink such that the grouping data obtained in step S07 and the semantic data obtained in step S08 are added to the pre-assignment ink. Hereinafter, the digital ink Ink with the grouping data and the semantic data added thereto may be referred to as "post-assignment ink."

In step S10, the digital ink server 20 transmits the post-assignment ink updated in step S09 to the user terminal 40.

In step S11, the user terminal 40 receives the data transmitted from the digital ink server 20 in step S10, thus acquiring the post-assignment ink including the grouping data and the semantic data.

In step S12, the user terminal 40 stores the post-assignment ink acquired in step S11 in the memory 47.

In step S13, the user terminal 40 checks that a determination condition concerning the grouping of strokes is satisfied, and enables a pointing operation relative to at least one group. An example of the "determination condition" is acquisition of semantic data from the digital ink server 20. In this case, groups G2 to G5 for which the semantic attributes have valid (other than NULL) values are chosen as targets of the enablement. It is to be noted that the enablement of the pointing operation is deferred for group G1, for which the semantic attribute has an invalid (NULL) value and thus no meaning is identified, or for one or more strokes that are in the midst of being written and thus have no meaning yet.

In step S14, the user terminal 40 causes groups G2 to G5 of strokes, for which the enablement has been performed in step S13, to be highlighted as compared to before the enablement. The "highlighting" means to change the mode of display to a mode that makes visual recognition easier for the user. Examples of highlighting include changing a display color, increasing a stroke width, adding an indication mark, and so on.

Figure 6A:
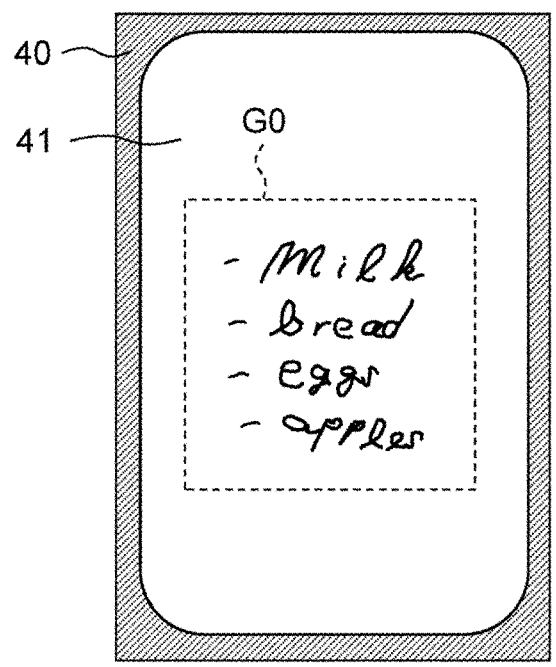
FIG. 6A is a transition diagram illustrating a first state change in a display of the user terminal.
Figure 6B:
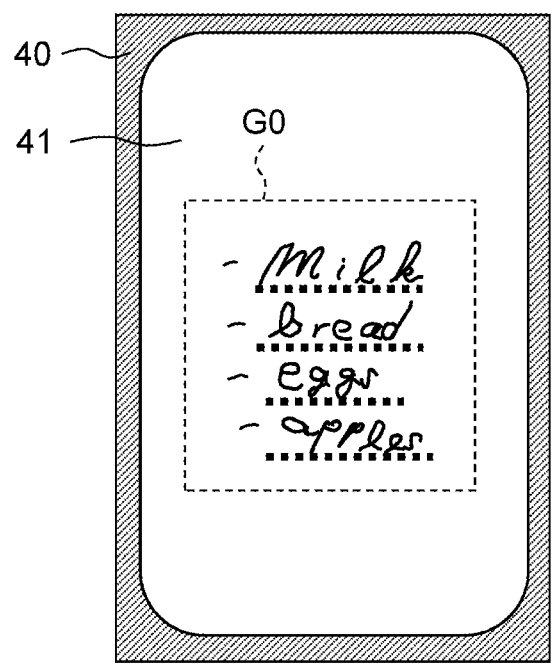
FIG. 6B is a transition diagram illustrating the first state change in the display of the user terminal.

FIGS. 6A and 6B are transition diagrams illustrating a first state change in a display of the user terminal 40. In more detail, FIG. 6A illustrates the state of the display before the enablement, while FIG. 6B illustrates the state of the display after the enablement. In the example of FIG. 6B, underlines are added at four positions corresponding to groups G2 to G5 in the set G0 of strokes. This allows the user to understand at a glance that the pointing operation has been enabled for the four words, "milk," "bread," "eggs," and "apples."

The first operation of the digital ink processing system 10 is thus finished. Once the first operation is finished, the digital ink processing system 10 can start the second operation.

Although, in the example described above, the pointing operation is enabled when the user terminal 40 has acquired the semantic data from the digital ink server 20, the determination condition is not limited to this example. For example, the determination condition may be acquisition of grouping data or semantic data through analysis of the digital ink Ink by the user terminal 40 itself, or arrival of a timing at which the digital ink Ink is automatically or manually stored. In addition, the determination condition may be receipt by the user terminal 40 of an operation of adding a mark or an annotation to at least a part of the set G0 of strokes.

Figure 7A:
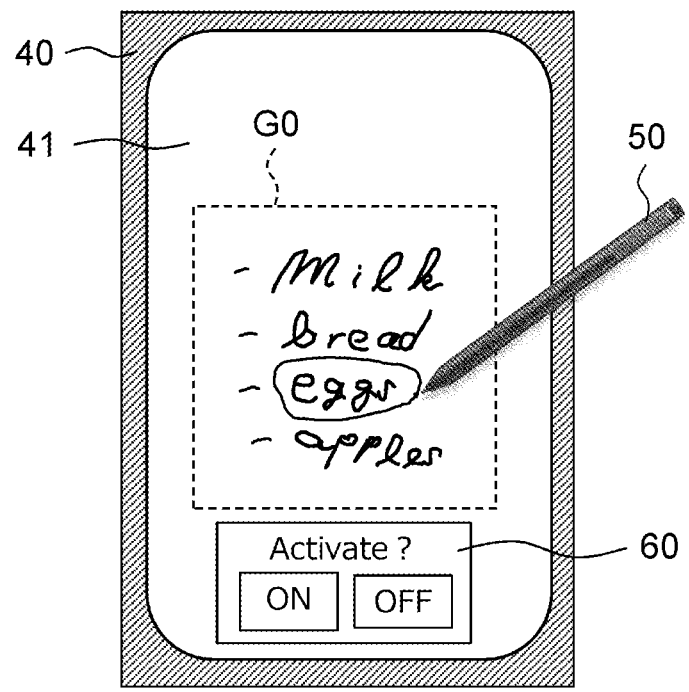
FIG. 7A is a transition diagram illustrating a second state change in the display of the user terminal.
Figure 7B:
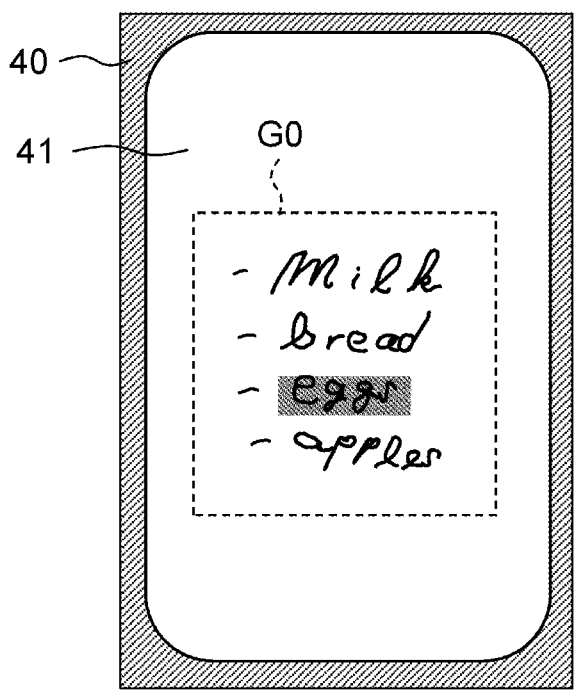
FIG. 7B is a transition diagram illustrating the second state change in the display of the user terminal.

FIGS. 7A and 7B are transition diagrams illustrating a second state change in the display of the user terminal 40. As illustrated in FIG. 7A, the user performs a writing operation of enclosing "eggs" with a circle (a so-called lasso) using the electronic pen 50 in a state in which no enablement has been performed for any part of the set G0 of strokes. As a result, along with the set G0 of strokes, a window 60 for checking whether or not an enablement is necessary for "eggs" is newly displayed. Here, when an [ON] button in the window 60 is touched, the state of the display of the user terminal 40 transitions from the state of FIG. 7A to the state of FIG. 7B.

As illustrated in FIG. 7B, the word (eggs) corresponding to group G4 in the set G0 of strokes is highlighted. This allows the user to understand at a glance that the pointing operation has been enabled only for the word "eggs."

<Second Operation: Content Citation Operation>

Next, the second operation of the digital ink processing system 10, that is, the content citation operation, will now be described below. The second operation is implemented jointly by the user terminal 40 (more specifically, the host processor 46) and the content server 30 (more specifically, the control unit 32).

Figure 8:
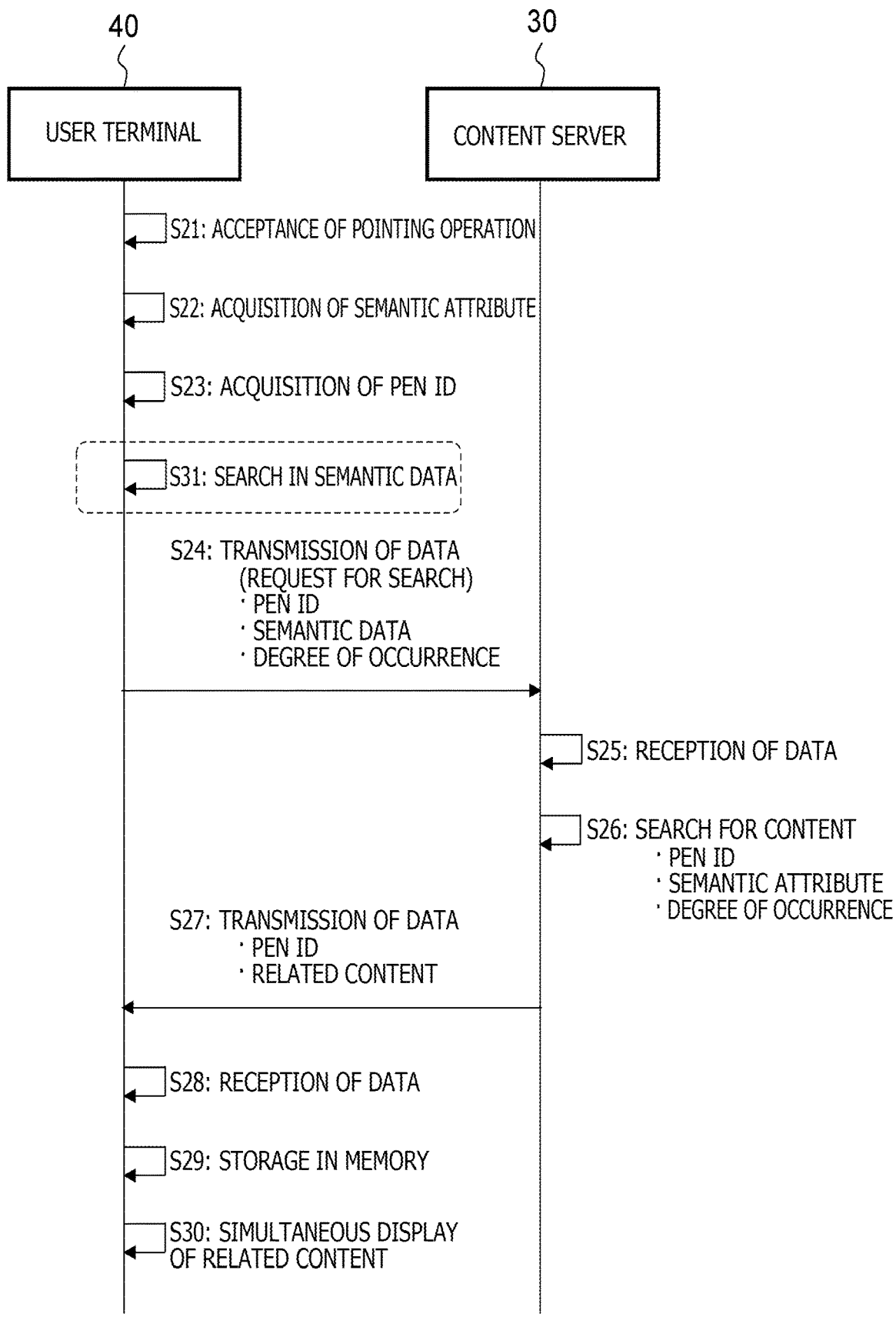
FIG. 8 is a sequence diagram concerning content citation operation of the digital ink processing system.

In step S21 in FIG. 8, the user terminal 40 accepts an operation (i.e., the pointing operation) of pointing at one of groups G2 to G5, for which the enablement has been performed, in the set G0 of strokes displayed on the touchscreen display 41 using the electronic pen 50. The pointing operation may be, for example, an operation of continuously pressing the position of "eggs" (group G4) in FIG. 6B or FIG. 7B.

In step S22, the user terminal 40 reads the post-assignment ink stored in the memory 47 and acquires the semantic attribute of group G4 pointed in step S21. Specifically, the user terminal 40 analyzes the grouping data of the post-assignment ink, thereby identifying a group ID corresponding to the position pointed at by the electronic pen 50. Then, the user terminal 40 analyzes the semantic data of the post-assignment ink, thereby identifying the semantic attribute corresponding to the group ID.

In step S23, the user terminal 40 receives, with the sensor electrode 43, a data signal transmitted from the electronic pen 50, thereby acquiring the pen ID of the electronic pen 50.

In step S24, the user terminal 40 transmits the semantic data acquired in step S22, with the pen ID acquired in step S23 associated therewith, to the content server 30. That is, the user terminal 40 requests the content server 30 to perform a search for content.

In step S25, the content server 30 receives the data transmitted from the user terminal 40 in step S24, thereby acquiring the pen ID and the semantic attribute.

In step S26, the content server 30 performs a search for content using the semantic attribute and the pen ID acquired in step S25. Specifically, the content server 30 sequentially performs [1] a search for content using the pen ID, and [2] a search within the content using the semantic attribute. Here, the pen ID serves as identification information (hereinafter, a use ID) for determining whether or not use of content is permitted. As the use ID, not only the pen ID but also identification information of user terminal 40 (hereinafter, a terminal ID), identification information of the user (hereinafter, a user ID), or a combination thereof may be used.

FIG. 9A is a diagram illustrating an example of the data structure of electronic pen information 62. The electronic pen information 62 indicates correspondence relationships between a "pen ID," which is the identification information of the electronic pen 50, a "school" to which the user belongs, and a "year/class" to which the user belongs. The pen ID corresponds to the use ID that manages usage of content. Examples of the "school" include a primary school, a junior high school, a high school, a college, a preparatory school, and so on. For the "year/class," various years or classes can be chosen according to the type of the school.

FIG. 9B is a diagram illustrating an example of the data structure of content management information 64. The content management information 64 indicates correspondence relationships between a "school" to which the user belongs, a "year/class" to which the user belongs, and "content types" that are available for use. Each of the "school" and the "year/class" is basically defined in the same manner as in the electronic pen information 62. Further, examples of the content types include titles of books, including textbooks, reference books, and workbooks, names of study subject, names of publishers, and so on.

The content server 30 reads the electronic pen information 62 and the content management information 64, and uses the "school" and the "year/class" as search keys to thereby acquire at least one type of content corresponding to the pen ID. Then, employing any of a variety of search methods, the content server 30 acquires, from within the content being searched, information (hereinafter referred to as "related content C1") that matches or approximately matches the "(value of) semantic attribute" that is used as a search key.

In step S27 in FIG. 8, the content server 30 transmits the related content C1 as a search result of step S26, with the pen ID associated therewith, to the user terminal 40.

In step S28, the user terminal 40 receives the data transmitted from the content server 30 in step S27, thereby acquiring the related content C1 and the pen ID.

In step S29, the user terminal 40 temporarily stores the related content C1 acquired in step S28 in the memory 47.

In step S30, the user terminal 40 displays the related content C1, which is retrieved by the search, and the set G0 of strokes simultaneously on the touchscreen display 41.

Figure 10A:
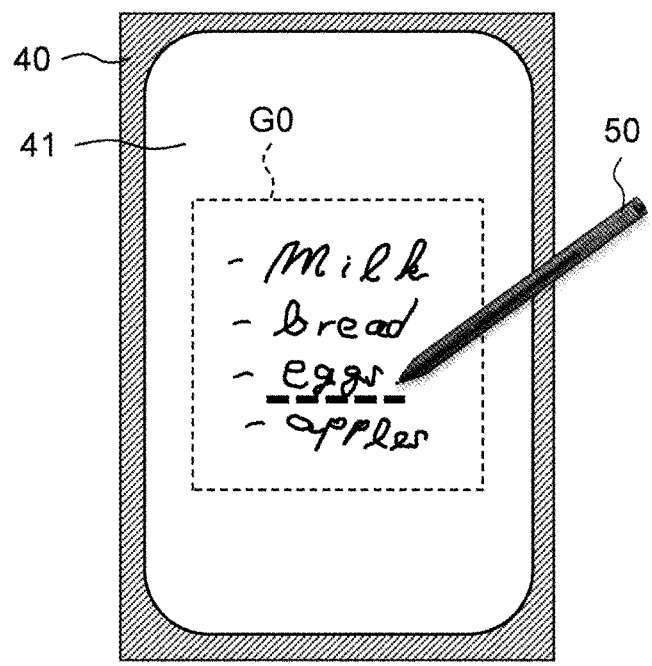
FIG. 10A is a transition diagram illustrating a third state change in the display of the user terminal.
Figure 10B:
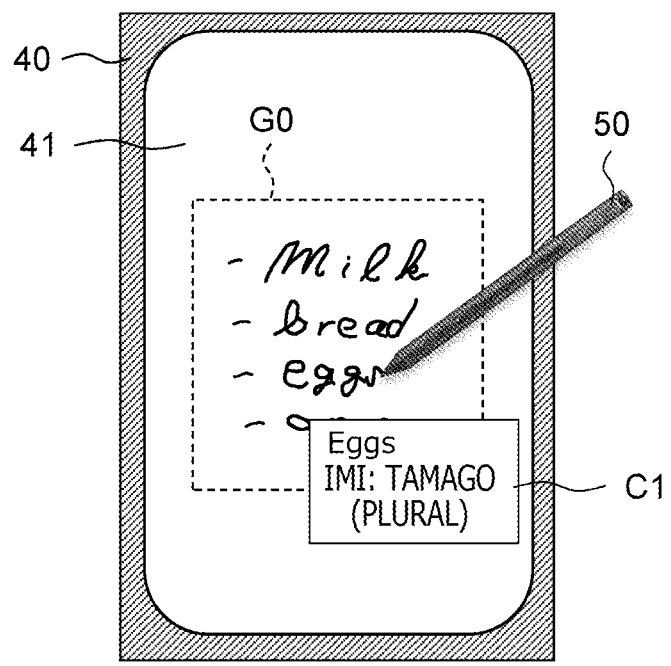
FIG. 10B is a transition diagram illustrating the third state change in the display of the user terminal.

FIGS. 10A and 10B are transition diagrams illustrating a third state change in the display of the user terminal 40. In more detail, FIG. 10A illustrates the state of the display before the related content C1 appears, while FIG. 10B illustrates the state of the display after the related content C1 appears. As will be understood from these figures, the related content C1 is displayed near (here, at the lower right of) "eggs" as a result of the pointing operation performed on the position of "eggs." The related content C1 includes "eggs" written in English and "Imi: tamago" written in Japanese.

The user can easily recognize that a Japanese translation of the English word "eggs," which has been pointed at using the electronic pen 50, is "tamago (plural)." Thus, the digital ink processing system 10 provides a learning support service that facilitates learning with increased efficiency.

Here, the administrator of the electronic notebook may decide to lend the user in school the electronic notebook while prohibiting the user from taking the electronic notebook out of school. In such cases, by associating the use ID of the content with the pen ID, it is possible to allow the user to receive the above-described learning support service even at home.

Figure 11A:
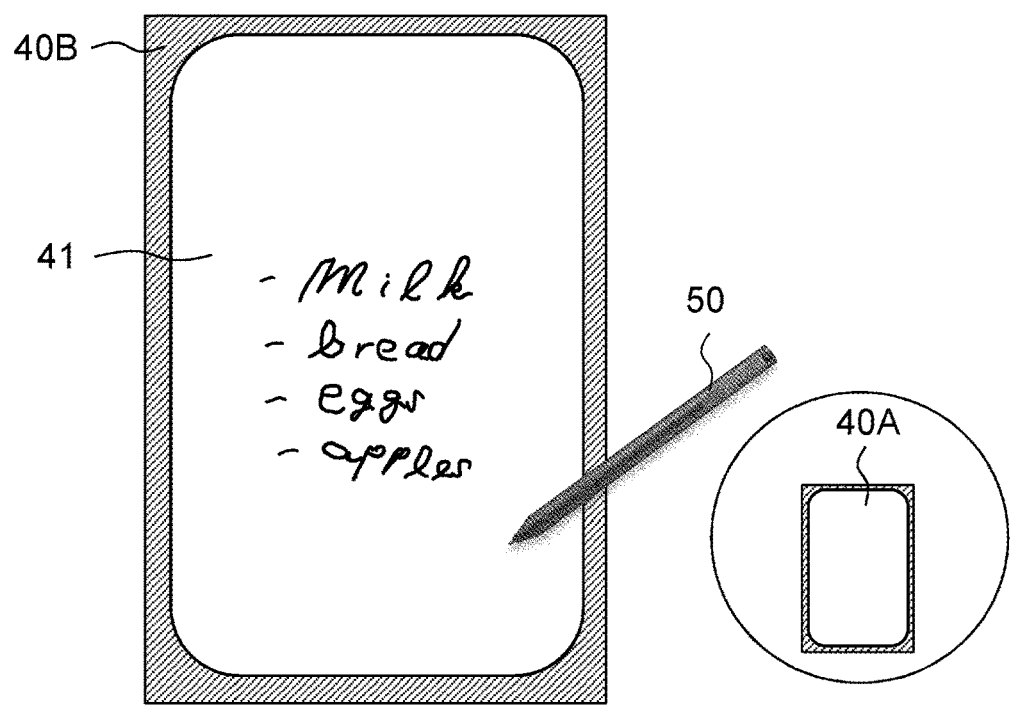
FIG. 11A is a diagram illustrating an example operation of a user terminal different from a user terminal on which handwriting input is performed.

FIG. 11A illustrates a case in which a user terminal 40B is different from a user terminal 40A on which handwriting input is performed using the electronic pen 50. For example, the user is able to edit the digital ink Ink using the same electronic pen 50, which has been brought back home from school. Alternatively, the digital ink processing system 10 may be configured to refer to the terminal ID included in the "device data" of the digital ink Ink, and if the user terminal 40B does not match the terminal ID restrict or prohibit editing of the digital ink Ink on the user terminal 40B.

Figure 11B:
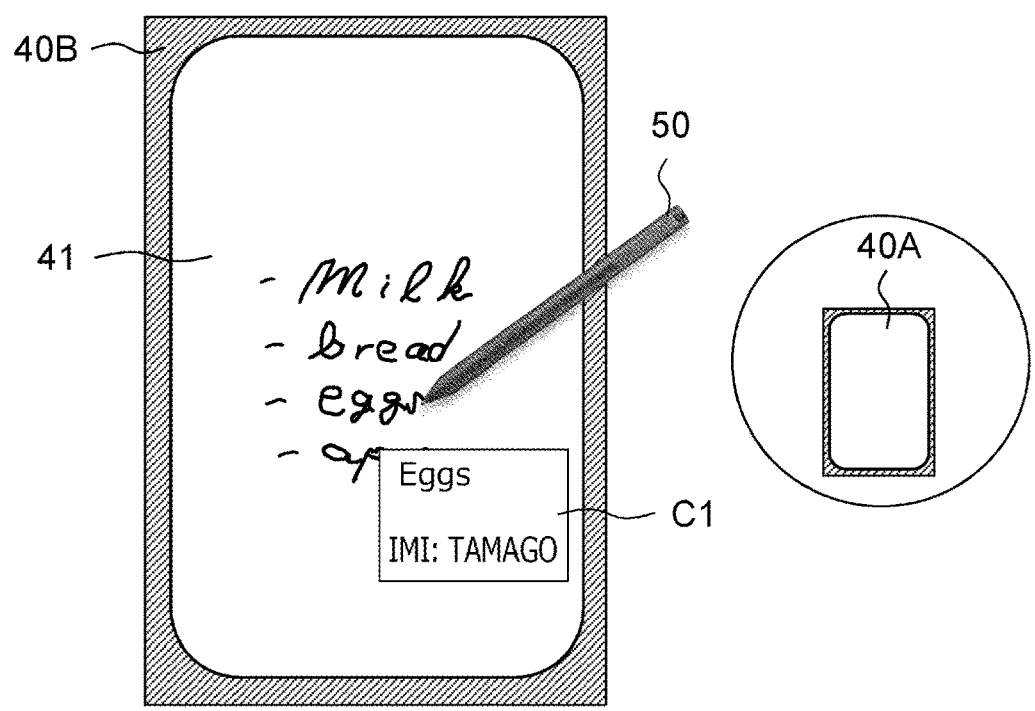
FIG. 11B is a diagram illustrating an example operation of a user terminal different from the user terminal on which handwriting input is performed.

Meanwhile, as illustrated in FIG. 11B, when the user has pointed at a relevant region using the electronic pen 50, the user terminal 40B is allowed to display the related content C1 on the touchscreen display 41 as in the case of the user terminal 40A. Thus, even in a situation in which it is difficult to freely move the user terminal 40A, the user is able to receive the learning support service at a variety of places by carrying his or her own electronic pen 50.

Refined Examples of Operation

Hereinafter, refined examples of the operation of the digital ink processing system 10 will be described with reference to FIGS. 12A to 13B.

First Refined Example

It is conceivable that, as the learning of the user progresses and his or her degree of achievement increases, information that the user desires to know will gradually change. Accordingly, the user terminal 40 may be configured to display different related content C1 and C2 depending on the degree of achievement of the user. For example, in the sequence diagram of FIG. 8, additional step S31 may be inserted between steps S23 and S24.

In step S31 in FIG. 8, the user terminal 40 performs a search in the semantic data with the "value" (for example, eggs) of the semantic attribute acquired in step S22 used as a keyword. The target of this search is not limited to the digital ink Ink being edited but may include digital ink Ink stored in the memory 47 of the user terminal 40 itself or in the digital ink server 20. For example, the user terminal 40 may count the number of "values" that match or approximately match the keyword, and calculate the number as the "degree of occurrence." Thereafter, in steps S24 and S25, transmission and reception of data including the degree of occurrence are performed between the user terminal 40 and the content server 30.

In step S26, the content server 30 performs a search for content using the pen ID, the semantic attribute, and the degree of occurrence acquired in step S25. Specifically, the content server 30 sequentially performs [1] a search for content using the pen ID, [2] a selection of content using the degree of occurrence, and [3] a search in the content using the semantic attribute.

Figures 12A, 12B:
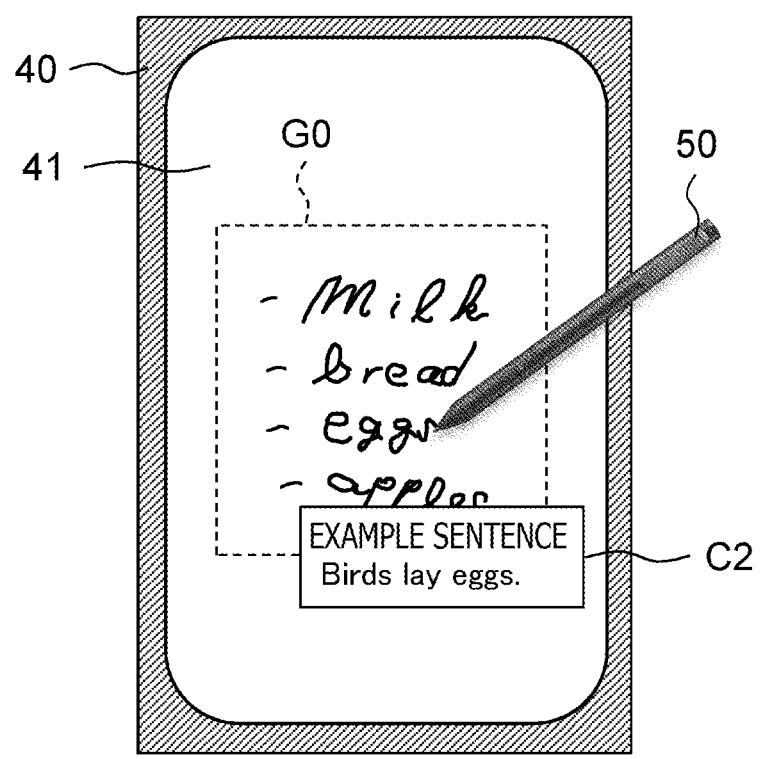
FIG. 12A is a diagram illustrating a first refined example of the operation of the digital ink processing system.
FIG. 12B is a diagram illustrating the first refined example of the operation of the digital ink processing system.

FIG. 12A is a diagram illustrating an example of the data structure of a determination table 66. The determination table 66 indicates correspondence relationships between the "number of occurrences," which indicates the degree of occurrence, and the "degree of achievement" of typical users. In the example of this figure, the determination table 66 describes determination criterions that determine [1] the degree of achievement to be low when the number of occurrences is less than 9, [2] the degree of achievement to be intermediate when the number of occurrences is 10 or more and less than 20, and [3] the degree of achievement to be high when the number of occurrences is 20 or more. Note that, although the number of occurrences is used as an example of the degree of occurrence in this figure, the frequency of occurrences may be used in combination therewith or alternatively.

The content server 30 identifies the degree of achievement of the user from the degree of occurrence using the determination table 66, and thereafter selects content that matches the degree of achievement from among a plurality of types of content corresponding to the pen ID. Suppose, for example, that the related content C2, which is different from the related content C1 illustrated in FIG. 10B, has been acquired for a user who has a higher degree of achievement. Thereafter, steps S27 to S29 are performed in a manner similar to that described above.

In step S30, the user terminal 40 displays the related content C2 retrieved by the search on the touchscreen display 41 with the set G0 of strokes. As illustrated in FIG. 12B, the related content C2 is displayed together at a position near "eggs," on which the pointing operation is performed. The related content C2 includes a string of characters of an example sentence "Birds lay eggs." in which the English word "eggs" is used.

As described above, when different related content C1 or C2 is displayed depending on the degree of occurrence of the semantic attribute in the same use ID (here, pen ID), suitable information can be presented to each individual user having a different degree of achievement. Note that there is a high correlation between the degree of occurrence and the degree of interest of the user, and therefore, it may be useful to perform a display similar to the display in the case of the degree of achievement described above.

Second Refined Example

Electronic notebooks are respectively used by individuals, and a condition may be undesirable in which an electronic notebook of one person can be freely edited by another person. Accordingly, the user terminal 40 may be configured to be capable of changing editing rights depending on the pen ID of an electronic pen 50A or 50B.

Figure 13A:
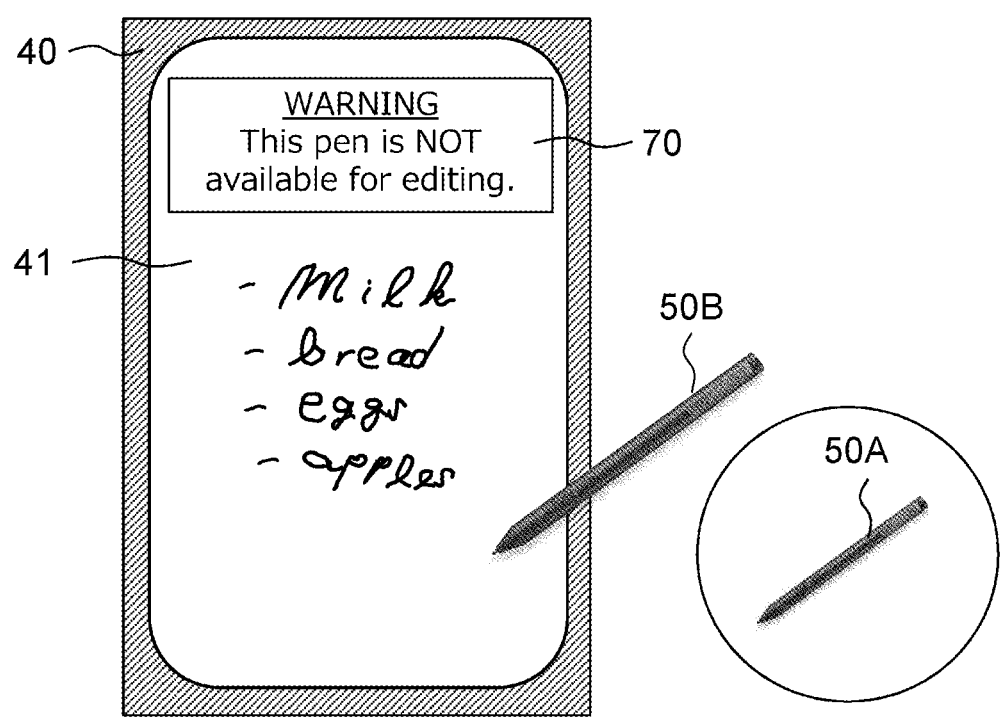
FIG. 13A is a diagram illustrating a second refined example of the operation of the digital ink processing system.

As illustrated in FIG. 13A, the pen ID (for example, ID=002) of the electronic pen 50B, which has been recognized by the user terminal 40, is different from the pen ID (for example, ID=001) of the electronic pen 50A, which has been used in the handwriting input. In this case, the user terminal 40 displays, on the touchscreen display 41, a message 70 that indicates that editing of the digital ink Ink is restricted. In the situation in which the message 70 is displayed, the user terminal 40 prohibits or restricts editing of the digital ink Ink using the electronic pen 50B. Here, "prohibiting" means an operation of rejecting an operation related to editing. Meanwhile, "restricting" means an operation of disabling some of functions related to editing.

Figure 13B:
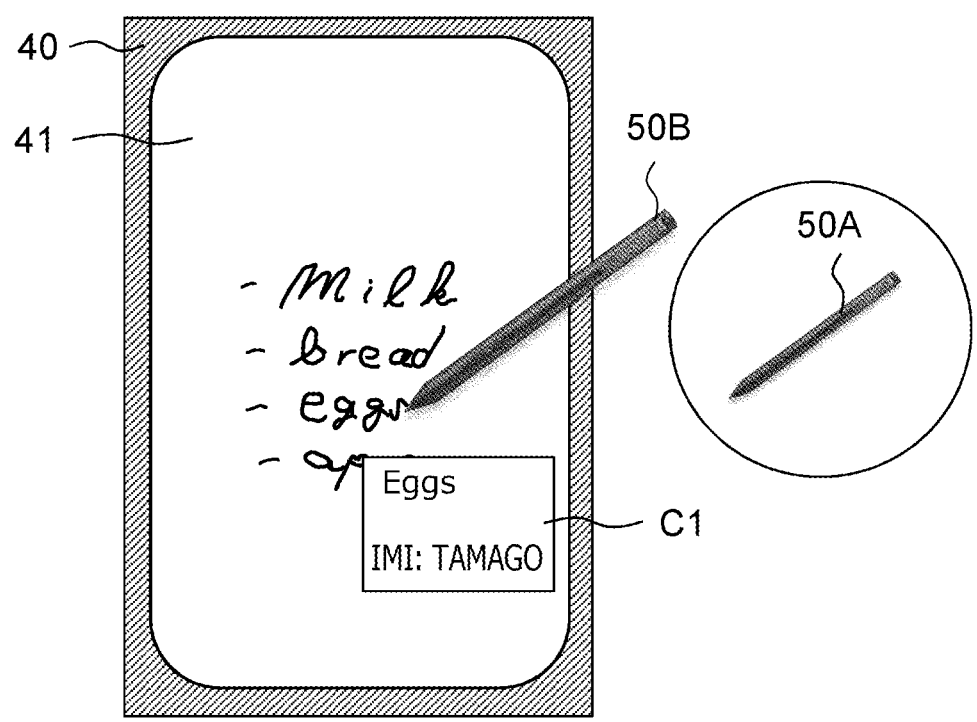
FIG. 13B is a diagram illustrating the second refined example of the operation of the digital ink processing system.

Meanwhile, as illustrated in FIG. 13B, when the user points at the relevant region using the electronic pen 50B, the user terminal 40 displays the related content C1 on the touchscreen display 41 as in the case of the electronic pen 50A. Thus, while the user can prevent his or her electronic notebook from being freely edited by others, any other person could receive content citation service thereon.

[Charging Flow of Learning Support Service]

Here, along with provision of the above-described learning support service, charging and payment are made as for [1] a usage fee of a semantic interpretation service and [2] a usage fee of the content citation service. Hereinafter, a flow of charging performed between the digital ink server 20, the content server 30, the user terminal 40, and a business entity-side server 80 will be described.

Here, the business entity-side server 80 is a server managed by a business entity (e.g., a publisher) that provides content. Note that, although it is assumed for the ease of description that the user terminal 40 is involved in the flow of charging, a school-side server (not illustrated) that manages the individual user terminals 40 may be additionally or alternatively involved in the flow of charging.

First Example

Figure 14:
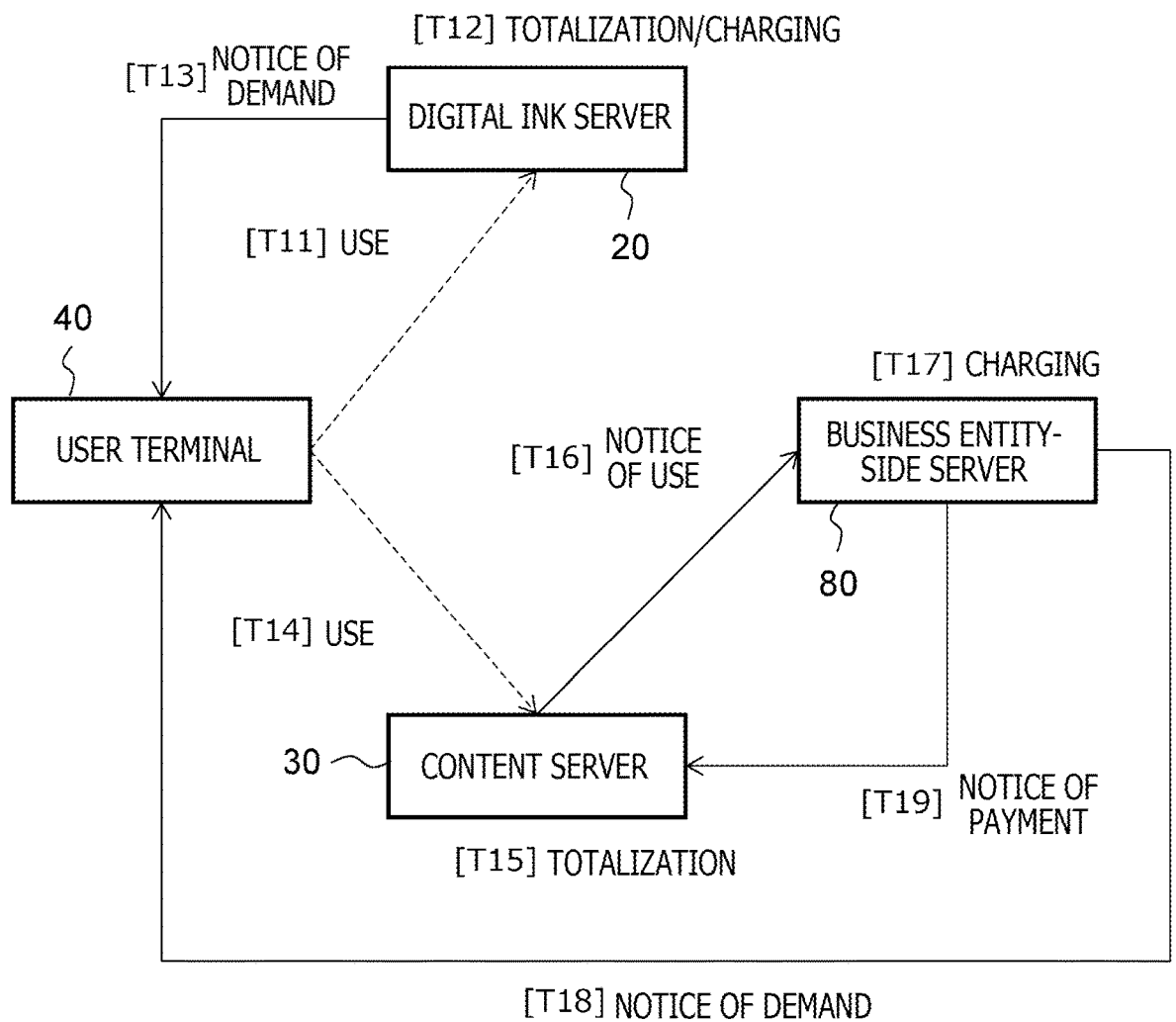
FIG. 14 is a schematic diagram illustrating a first example of a flow of charging made at the time of a learning support service.

FIG. 14 is a schematic diagram illustrating a first example of the flow of charging made at the time of the learning support service.

[T111] The user terminal 40 makes access to the digital ink server 20 each time the semantic interpretation service is used.

[T121] The digital ink server 20 totals usage of the semantic interpretation service for each user on each cutoff date for usage fees, and performs a charging process of charging the usage fees of the service in accordance with a predetermined charging rule.

[T131] The digital ink server 20 provides, to each user terminal 40, a notice of demand for the usage fee determined by the charging process. When the user, receiving this notice, makes a payment by a due date, the payment of the usage fee by the user is completed.

[T14] Meanwhile, the user terminal 40 makes access to the content server 30 each time the content citation service is used.

[T15] The content server 30 totals usage of content involved in the content citation service for each user on each cutoff date for usage fees.

[T16] The content server 30 provides, to the business entity-side server 80, a notice of usage of content by each user.

[T17] The business entity-side server 80 performs a charging process of charging the usage fees of the content in accordance with a predetermined charging rule on the basis of a result of the totaling of the usage.

[T18] The business entity-side server 80 provides, to each user terminal 40, a notice of demand for the usage fee determined by the charging process. When the user, receiving this notice, makes a payment by a due date, the payment of the usage fee by the user is completed.

[T19] The business entity-side server 80 provides, to the content server 30, a notice of payment of a fee for provision of a service platform in accordance with a predetermined contract rule (e.g., a variable fee system that charges a fee in proportion to the usage fees of the content).

Second Example

Figure 15:
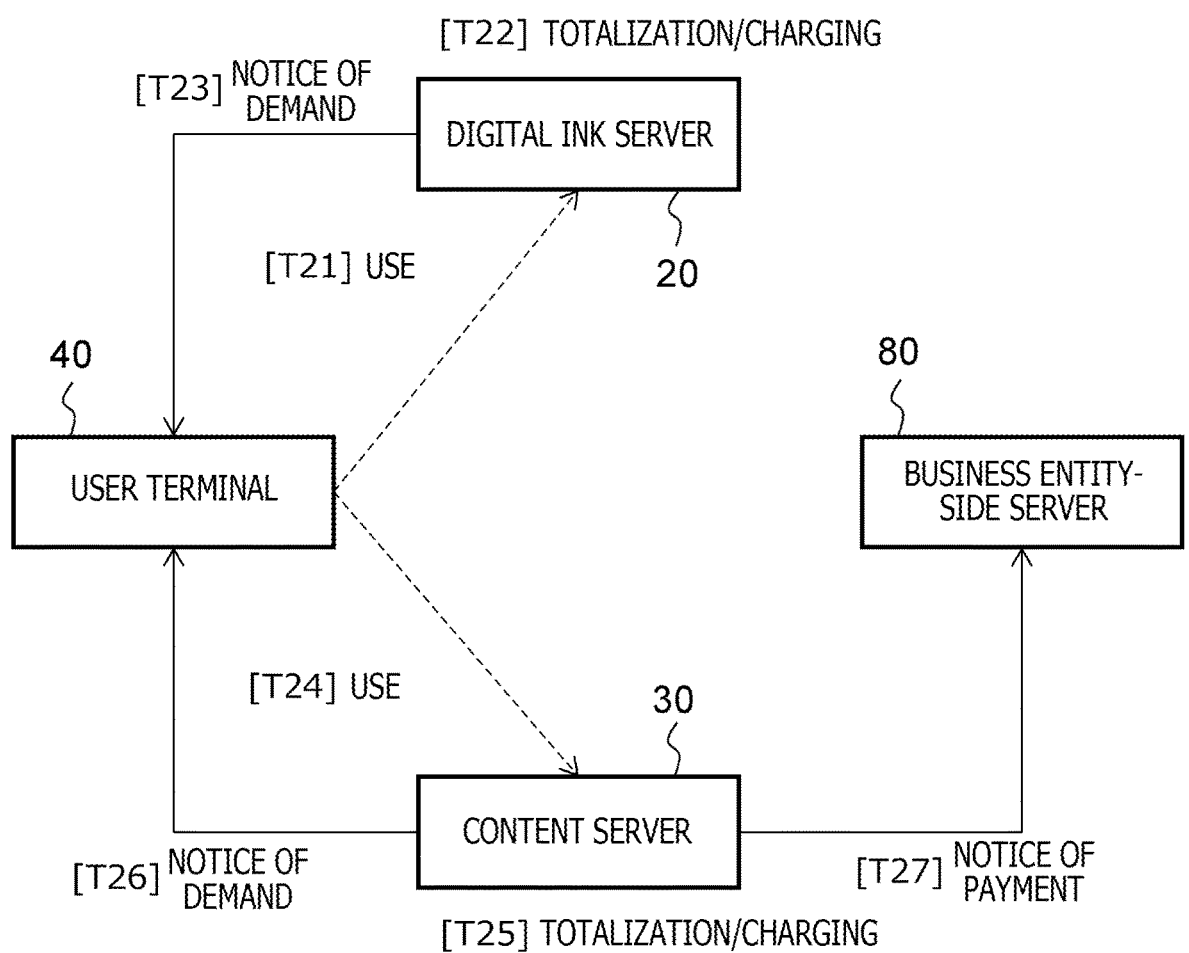
FIG. 15 is a schematic diagram illustrating a second example of the flow of charging made at the time of the learning support service.

FIG. 15 is a schematic diagram illustrating a second example of the flow of charging made at the time of the learning support service.

[T21] The user terminal 40 makes access to the digital ink server 20 each time the semantic interpretation service is used.

[T22] The digital ink server 20 totals usage of the semantic interpretation service for each user on each cutoff date for usage fees, and performs a charging process of charging the usage fees of the service in accordance with a predetermined charging rule.

[T23] The digital ink server 20 provides, to each user terminal 40, a notice of demand for the usage fee determined by the charging process. When the user, receiving this notice, makes a payment by a due date, the payment of the usage fee by the user is completed.

[T24] Meanwhile, the user terminal 40 makes access to the content server 30 each time the content citation service is used.

[T25] The content server 30 totals usage of content involved in the content citation service for each user on each cutoff date for usage fees, and performs a charging process of charging the usage fees of the content in accordance with a predetermined charging rule.

[T26] The content server 30 provides, to each user terminal 40, a notice of demand for the usage fee determined by the charging process. When the user, receiving this notice, makes a payment by a due date, the payment of the usage fee by the user is completed.

[T27] The content server 30 provides, to the business entity-side server 80, a notice of payment of an amount obtained by subtracting a fee for provision of the service platform from the usage fees of the content.

[Example Modifications] It is needless to say that the present disclosure is not limited to the above-described embodiments, and that various modifications can be made thereto without departing from the principles of the disclosure. Also note that various features thereof may be combined optionally as long as no technical conflict arises.

Although, in the above-described embodiments, the digital ink processing system 10 is configured to provide a learning support service to support education for students, the type of the service and target users are not limited to the above-described examples.

Although the digital ink server 20 performs the grouping of strokes and the assignment of semantic attributes in the above-described embodiments, the user terminal 40 may be configured to be capable of performing the grouping or both the grouping and the assignment in place of the digital ink server 20. For example, the user terminal 40 itself may analyze the digital ink Ink to acquire the semantic attributes, or the user terminal 40 may acquire the semantic attributes through a manual input operation by the user.

Although the digital ink Ink in which the semantic data is defined has been used as an example in the description of the above-described embodiments, digital ink Ink in which the semantic data is not defined may be used. In this case, the digital ink Ink and the semantic data may be associated with each other and managed, so that an operation similar to that of the above-described embodiments can be realized.

[Summary of Embodiments] As described above, the digital ink processing system 10 includes the electronic pen 50, and the user terminal 40 that is configured to be capable of accepting a writing operation by the electronic pen 50 through the touchscreen display 41 and generating the digital ink Ink describing the set G0 of strokes. The user terminal 40 enables the pointing operation of the electronic pen 50 relative to groups G2 to G5 of strokes, which satisfy the determination condition concerning the grouping of strokes, within the set G0 displayed on the touchscreen display 41, while deferring the enablement of the pointing operation relative to group G1 of strokes, which does not satisfy the determination condition. If any enabled pointing operation is received, the user terminal 40 performs a search for content related to the semantic attribute of the specified one of groups G2 to G5, or requests an external entity to perform the search, and displays the related content C1 or C2 retrieved by the search on the touchscreen display 41 with the set G0.

In addition, according to a digital ink processing method and a digital ink processing program, the user terminal 40 performs the step (S13) of enabling the pointing operation of the electronic pen 50 relative to groups G2 to G5 of strokes which satisfy the determination condition concerning the grouping of strokes within the set G0 of strokes displayed on the touchscreen display 41, while deferring the enablement of the pointing operation relative to group G1 of strokes which does not satisfy the determination condition, and the step (S30) of, if any enabled pointing operation is received (S21), performing a search for content related to the semantic attribute assigned to groups G2-G5 or requesting an external entity to perform the search (S24), and displaying the related content C1 or C2 retrieved by the search on the touchscreen display 41 along with the set G0.

As described above, because the pointing operation of the electronic pen 50 is enabled only with respect to groups G2 to G5 of strokes which satisfy the determination condition concerning the grouping of strokes, a search for content will be permitted only with respect to groups G2 to G5 which are highly likely to have meanings as collections when the determination condition is properly set. This makes it possible to present, to the user, useful and highly relevant information as a search result when a search is performed using the digital ink Ink.

In addition, the user terminal 40 may cause groups G2 to G5, for which the pointing operation has been enabled, to be highlighted as compared to before the enablement. This makes it easier for the user to visually recognize the enablement of the pointing operation and the positions thereof.

Further, the determination condition may be assignment of the semantic attribute to groups G2-G5 of strokes. This makes it possible to perform a search using the assigned semantic attribute as a search key so that the user can obtain a more useful search result.

Furthermore, while the digital ink server 20 analyzes the digital ink Ink transmitted from the user terminal 40 and thus assigns the semantic attributes to groups G2 to G5, the determination condition may be acquisition of the semantic data representative of the semantic attributes from the digital ink server 20. The assignment of the semantic attributes by the digital ink server 20 in place of the user terminal 40 reduces the analytical load on the user terminal 40.

Furthermore, the determination condition may be acceptance of a user operation of adding a mark or an annotation to groups G2-G5. This makes it possible for a user who performs the operation to specify, through the mark or annotation, a collection of strokes, in which the user finds meaning, leading to an increased likelihood that a more accurate semantic attribute will be obtained.

Furthermore, the content server 30 may store content in association with use IDs, and the user terminal 40 may transmit data including the use ID and the semantic attribute to the content server 30 and may request a search to thereby acquire, from the content server 30, the related content C1 or C2 which is related to the semantic attribute and which is usable.

Furthermore, the user terminal 40 may acquire different related content C1 or C2 depending on the degree of occurrence of the semantic attribute based on the same use ID. When the degree of occurrence, which is highly correlated with the degree of achievement or degree of interest of the user, is taken into account, suitable information can be selected and presented to each of users who may vary in the degree of achievement or degree of interest.

Furthermore, the use ID may be the pen ID for identifying the electronic pen 50. This makes it possible to associate the electronic pen 50 with content available for use, making it possible to present the same related content C1 or C2 when the same electronic pen 50 is used, regardless of which of the user terminals 40A or 40B may be used.

Furthermore, in the case where the digital ink Ink has been generated using the electronic pen 50A that is assigned a first pen ID, and the electronic pen 50B is used that is assigned a second pen ID different from the first pen ID, the user terminal 40 may prohibit or restrict editing of the digital ink Ink while accepting the pointing operation by the electronic pen 50B. Thus, while the digital ink Ink generated by the user is prohibited from being freely edited, the same related content C1 or C2 as will be presented to the user will be presented even to a person other than the user.

Furthermore, the content server 30 may perform a charging process in accordance with usage of content for the user of the content and a business entity that provides the content. Thus, management of the content and management of usage fees can be accomplished in a centralized manner by a single apparatus.

DESCRIPTION OF REFERENCE SYMBOLS

10: Digital ink processing system
20: Digital ink server
30: Content server
40, 40A, 40B: User terminal
41: Touchscreen display
50, 50A, 50B: Electronic pen
80: Business entity-side server
C1, C2: Related content
G0: Set
G1 to G5: Group
Ink: Digital ink

The invention claimed is:

1. A tablet including processing circuitry configured to:
generate digital ink describing a stroke or strokes according to an input made by an electronic pen;
acquire a semantic attribute of the stroke or strokes pointed to by the electronic pen;
transmit data including a use ID and the semantic attribute to a content server, which stores multiple pieces of content in association with multiple use IDs, to request the content server to perform a search for content based on the data; and
perform control so as to display the content retrieved by the search on a display with the stroke or strokes.

2. The tablet according to claim 1, wherein the processing circuitry performs control so as to highlight the stroke or strokes pointed to by the electronic pen on the display.

3. The tablet according to claim 1, wherein the processing circuitry enables a pointing operation by the electronic pen with respect to the stroke or strokes, to which the semantic attribute has been assigned.

4. The tablet according to claim 3, wherein the processing circuitry is configured to:
transmit the digital ink to a digital ink server configured to analyze the digital ink to assign the semantic attribute to the stroke or strokes; and
receive semantic data representative of the semantic attribute from the digital ink server.

5. The tablet according to claim 1, wherein the processing circuitry enables a pointing operation by the electronic pen with respect to the stroke or strokes, on which a user operation of adding a mark or an annotation has been performed.

6. The tablet according to claim 1, wherein the content is retrieved by the search when use of the content is permitted.

7. The tablet according to claim 1, wherein a different one of the content is retrieved by the search depending on a degree of occurrence of the semantic attribute based on the same use ID.

8. The tablet according to claim 1, wherein the use ID is a pen ID that identifies the electronic pen.

9. The tablet according to claim 8, wherein
in a case where the digital ink is generated using a first electronic pen that is assigned a first pen ID, and a second electronic pen is used that is assigned a second pen ID different from the first pen ID,
the processing circuitry prohibits or restricts editing of the digital ink by the second electronic pen.

10. A digital ink processing method implemented by a tablet including a processor, the digital ink processing method comprising:
generating digital ink describing a stroke or strokes according to an input made by an electronic pen;
acquiring a semantic attribute of the stroke or strokes pointed to by the electronic pen;
transmitting data including a use ID and the semantic attribute to a content server, which stores multiple pieces of content in association with multiple use IDs, to request the content server to perform a search for content based on the data; and
performing control so as to display the content retrieved by the search on a display with the stroke or strokes.

11. A non-transitory computer-readable medium including a digital ink processing program, which, when executed by a processor of a tablet, causes the processor to:
generate digital ink describing a stroke or strokes according to an input made by an electronic pen;
acquire a semantic attribute of the stroke or strokes pointed to by the electronic pen, transmit data including a use ID and the semantic attribute to a content server, which stores multiple pieces of content in association with multiple use IDs, to request the content server to perform a search for content based on the data; and
perform control so as to display the content retrieved by the search on a display with the stroke or strokes.

12. The non-transitory computer-readable medium according to claim 11, wherein the digital ink processing program causes the processor to perform control so as to highlight the stroke or strokes pointed to by the electronic pen on the display.

13. The non-transitory computer-readable medium according to claim 11, wherein the digital ink processing program causes the processor to enable a pointing operation by the electronic pen with respect to the stroke or strokes, to which the semantic attribute has been assigned.

14. The non-transitory computer-readable medium according to claim 13, wherein the digital ink processing program causes the processor to:
   transmit the digital ink to a digital ink server configured to analyze the digital ink to assign the semantic attribute to the stroke or strokes; and
   receive semantic data representative of the semantic attribute from the digital ink server.

15. The non-transitory computer-readable medium according to claim 11, wherein the digital ink processing program causes the processor to enable a pointing operation by the electronic pen with respect to the stroke or strokes, on which a user operation of adding a mark or an annotation has been performed.

16. The non-transitory computer-readable medium according to claim 11, wherein the content is retrieved by the search when use of the content is permitted.

17. The non-transitory computer-readable medium according to claim 11, wherein a different one of the content is retrieved by the search depending on a degree of occurrence of the semantic attribute based on the same use ID.

18. The non-transitory computer-readable medium according to claim 11, wherein the use ID is a pen ID that identifies the electronic pen.

19. The non-transitory computer-readable medium according to claim 18, wherein
   in a case where the digital ink is generated using a first electronic pen that is assigned a first pen ID, and a second electronic pen is used that is assigned a second pen ID different from the first pen ID,
   the digital ink processing program causes the processor to prohibit or restrict editing of the digital ink by the second electronic pen.

* * * * *